(12) United States Patent
Hecht et al.

(10) Patent No.: US 6,439,809 B1
(45) Date of Patent: Aug. 27, 2002

(54) DEVICE FOR INSERTING ELONGATED OBJECTS INTO CLAMPS

(75) Inventors: Reinhard Hecht; Karl Manstorfer, both of Regensburg (DE); Hanspeter Ulrich; Hans Wyder, both of Monchaltorf (CH); Hans Bunschi; Marco Weingarten, both of Zurich (CH)

(73) Assignee: Ka-Te System AG, Zurich (CH)

( * ) Notice: Subject to any disclaimer, the term of this patent is extended or adjusted under 35 U.S.C. 154(b) by 0 days.

(21) Appl. No.: 09/601,250

(22) PCT Filed: Aug. 7, 1998

(86) PCT No.: PCT/CH98/00332

§ 371 (c)(1),
(2), (4) Date: Oct. 5, 2000

(87) PCT Pub. No.: WO99/43063

PCT Pub. Date: Aug. 26, 1999

(30) Foreign Application Priority Data

Feb. 17, 1998 (EP) .............................................. 98102683

(51) Int. Cl.[7] ................................................. F16L 3/00

(52) U.S. Cl. ................................. 405/184.4; 405/154.1; 405/183.5

(58) Field of Search ........................... 405/154.1, 183.5, 405/184, 184.4; 248/49, 58, 63

(56) References Cited

U.S. PATENT DOCUMENTS 4,647,251 A * 3/1987 Gale ........................... 405/154
5,538,207 A * 7/1996 O'Connell et al. ........... 248/49

FOREIGN PATENT DOCUMENTS

EP        0 109 739        5/1984
EP        0 251 907        1/1988

* cited by examiner

*Primary Examiner*—Heather Shackelford
*Assistant Examiner*—John Kreck
(74) *Attorney, Agent, or Firm*—Oliff & Berridge, PLC

(57) ABSTRACT

A device to accommodate simple and efficient insertion of elongate articles, such as wires, cables or pipes, into clamps adjacent one another inside an inaccessible tube. A setting head having at least two parallel and adjacent receiving grooves receive the elongate articles and a guide means is adjustable to accommodate various sized tables.

18 Claims, 12 Drawing Sheets

DEVICE FOR INSERTING ELONGATED OBJECTS INTO CLAMPS

The present invention relates to a device for inserting elongate articles, such as cables or pipes, into clamps which are arranged inside a man-inaccessible tube, according to the precharacterizing clause of claim 1.

A device of this type is known from EP-A-0 109 739. It has a frame which is capable of being supported on the inner wall of a tube via runners and which can be moved in the longitudinal direction of the tube by means of a rope. Arranged on the frame, one behind the other in the longitudinal direction, are two setting heads which are individually driven displaceably in the longitudinal direction, rotably about the longitudinal axis and movably in the radial direction and which each have a receiving groove, running in the longitudinal direction, receiving one and the same cable. In order to bend the cable into the desired direction, the two setting heads are rotated relative to one another about the longitudinal axis. In order to insert the directed cable into a clamp fastened to the tube wall, the two setting heads are moved, as seen in the pulling direction of the rope, into a position located downstream of the clamp and then outward in the radial direction, in order to insert the cable into the clamp. A supporting means, likewise capable of being supported via runners on the inner wall of the tube, is suspended on the frame and has a supporting element movable in the radial direction by means of a cylinder/piston assembly and having a depression for receiving the cable. By means of the supporting element, the cable is supported between the clamp, in which it has already been inserted, and the setting heads, by being pressed against the tube wall. For the supporting element to be moved past a clamp, said supporting element is temporarily lowered by means of the cylinder/piston assembly.

One object of the present invention is to provide a generic device which, while being of simple design, has substantially higher efficiency.

This object is achieved by means of a device which has the features of claim 1. A plurality of elongate articles can be inserted in a single operation into clamps arranged next to one another inside a man-inaccessible tube.

A particularly preferred embodiment of the device is specified in claim 2. This makes it possible, with one and the same setting head, to insert elongate articles into the clamps in tubes having different diameters. Furthermore, this embodiment makes it possible to arrange the clamps very closely next to one another, since adjacent articles are inserted successively into the respective clamps and therefore the range of deflection of only one clamp in each case is required.

The preferred embodiment specified in claim 8 makes it possible to adapt to different diameters of the man-inaccessible tube easily and efficiently. In this case, the main module, which, in particular, may also contain the drive for moving the setting head and the necessary electronic components and pneumatic or hydraulic valves, can be the same for all the relevant diameters of the man-inaccessible tube. Adaptation to different tube diameters in each case is obtained, using different adapters, by means of which the setting head or the guide means is offset correspondingly in the radial direction.

Further preferred embodiments of the subject of the invention are specified in the further dependent claims.

The present invention is explained in more detail by means of an exemplary embodiment illustrated in the purely diagrammatic drawing in which:

FIG. 1 shows a view of a device, arranged in a tube illustrated in section in a longitudinal direction, for inserting elongate articles into clamps;

FIG. 2 likewise shows a view of part of the device shown in FIG. 1, enlarged in relation to FIG. 1 and partly in sections;

Figure 1:
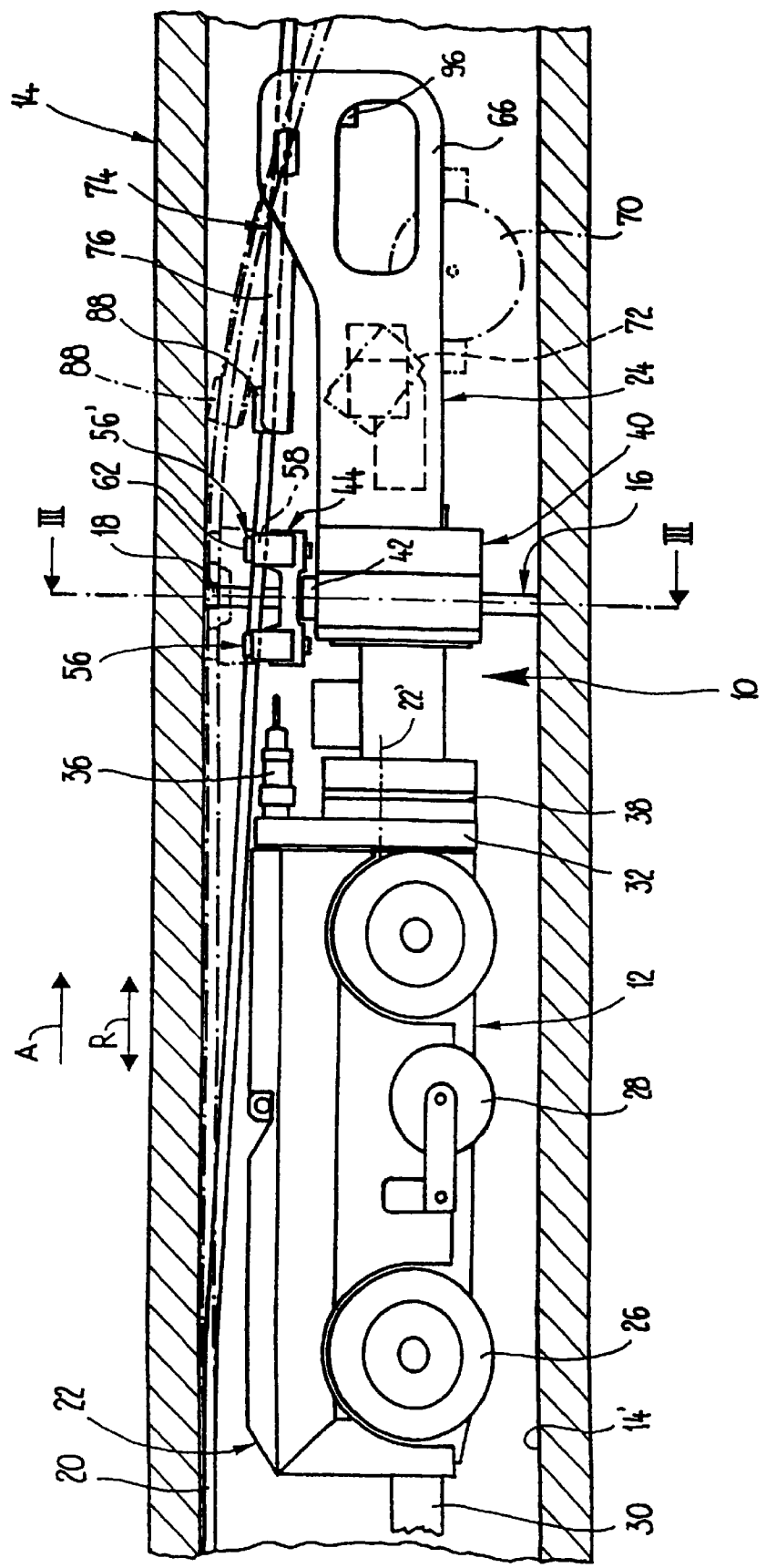

The device 10 illustrated in FIGS. 1 to 4 has a traveling frame 12 which is arranged inside a man-inaccessible tube 14, for example a drainage tube.

Arranged in the latter, at a distance from and one behind the other in the longitudinal direction R of the tube, are inner collars 16 which have, in the ceiling region of the tube 14, clip-like clamps 18 arranged next to one another in a circumferential direction. The device 10 is intended for inserting into the clamps elongate articles 20, such as cables or protective pipes for cables, which are drawn into the tube 14. The cables are, in particular, optical fiber cables which are used for data transmission. Cables of this type are also drawn into the protective pipes after these have been mounted in the tube 14 or are already arranged in the protective pipes during mounting.

The frame 12 has, on the one hand, a generally known remote-controlled self-propelled conduit robot vehicle 22 and, on the other hand, a working unit 24 arranged on the end face of the latter. The working unit 24 is capable of being moved by means of the conduit robot vehicle 22 in the longitudinal direction R of the tube to the inner collars 16 by the drive of the wheels 26 bearing on the tube inner wall 14'.

Arranged on the conduit robot vehicle 22 is a measuring wheel 28 which likewise bears on the tube inner wall 14' and is connected to a rotary-angle transducer which transmits the signals generated as a result of the rotation of the measuring wheel 28, via the feed and signal cable 30, to a control and monitoring unit arranged outside the tube system. The exact position of the device 10 in the tube 14 is known by means of the measuring wheel 28.

A turntable 32 is rotably mounted on that end wall of the conduit robot vehicle 22 which is at the front, as seen in the working direction A, and is capable of being pivoted about the longitudinal axis 22' of the conduit robot vehicle 22 into the desired rotary position by means of a rotary drive arranged in said conduit robot vehicle. As may be gathered, in particular, from FIG. 3, two output shafts 34 are mounted approximately diametrically opposite one another on the turntable 32 and are in each case connected in a known way to a drive assembly inside the conduit robot vehicle 22.

Furthermore, the turntable 32 has compressed-air and electrical control and signal connections 36 for the working unit 24. The latter is fastened removably to the turntable 32 by means of a bayonet fastening 38. Said connections 36 are connected via the feed and signal cable to feed units and to the control and monitoring unit which are arranged outside the tube system.

The working unit 24 has, adjoining the bayonet fastening 38, in the manner of a boom, a housing 40, in which a shank 42 is mounted displaceably in the radial direction in the longitudinal midplane, said shank carrying a setting head 44 at its end projecting beyond the housing 40. Inside the housing 40, a portion of the shank 42 is designed as a rack 46 which cooperates with a spur wheel 48 mounted on the housing 40. Said spur wheel is connected via a toothed belt 50 to a drive shaft 52 which, in turn, is coupled to one of the two output shafts 34 of the turntable 32. By this output shaft 34 being driven by means of the respective drive assembly arranged in the conduit robot vehicle, the setting head 44 can be moved in and out in the radial direction. In order to keep the rack 46 in engagement with the spur wheel 48, a support roller 54 is provided opposite said spur wheel.

Figure 2:
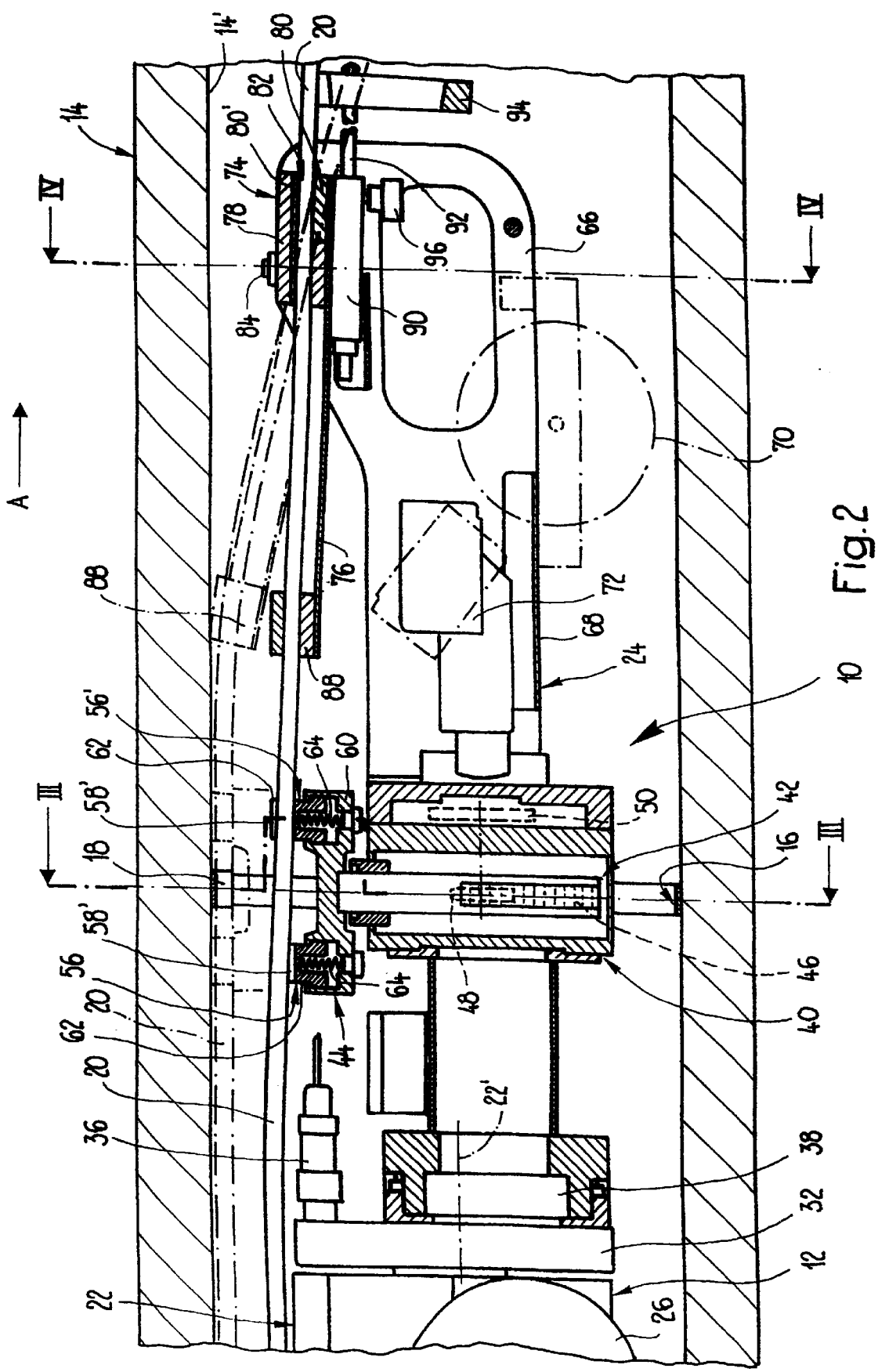
Figure 3:
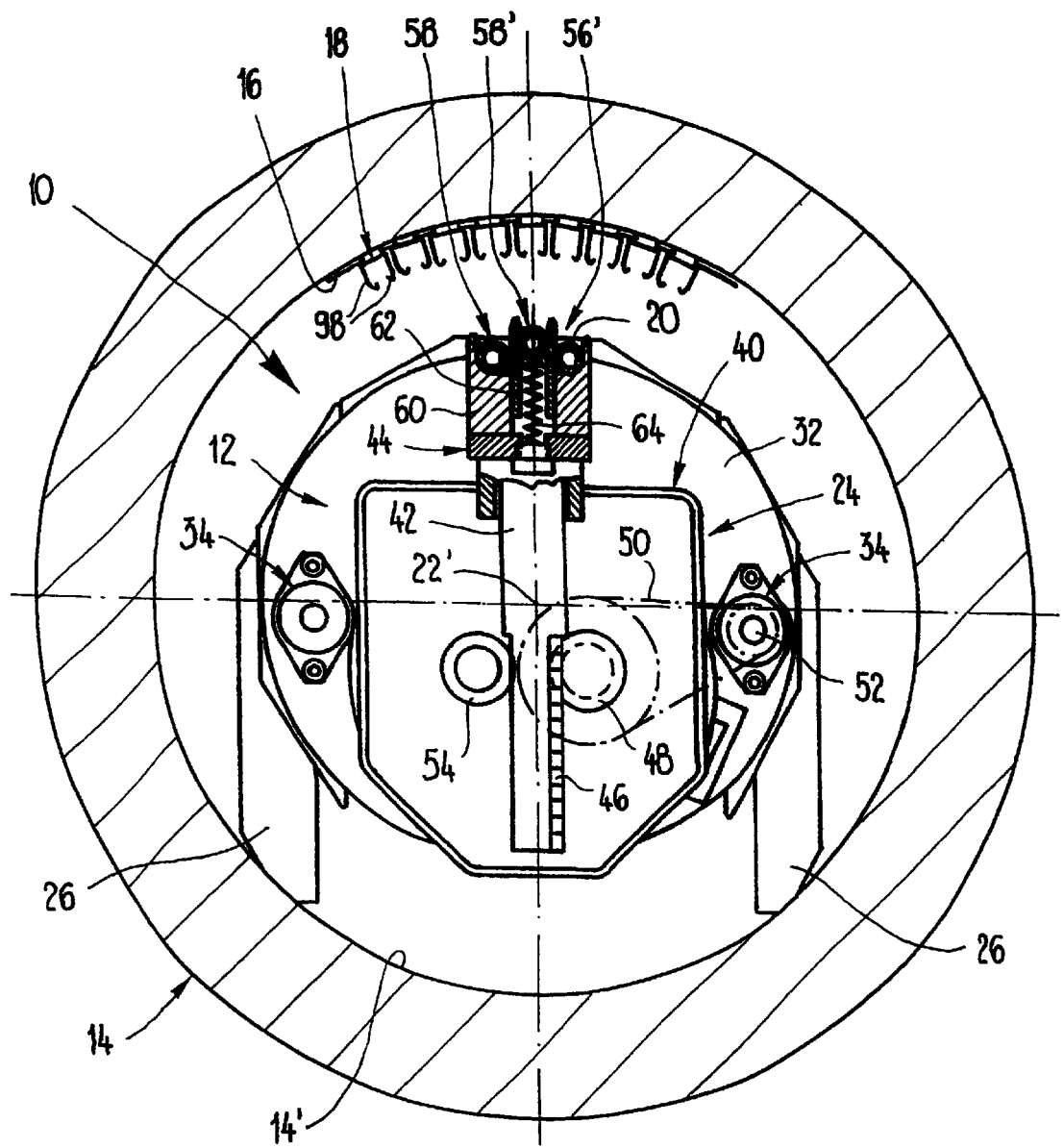
FIG. 3 shows the device shown in FIGS. 1 and 2 in a section along the line III—III of these figures.

The setting head 44 has two rows 56, 56', spaced from one another in the direction of the longitudinal axis 22', of receiving grooves 58 running in the direction of the longitudinal axis, the respectively mutually aligned receiving grooves 58 of the two rows 56, 56' being intended for receiving the same article 20. In the present case, each row 56, 56' has three receiving grooves 58 open outward in a radial direction, the two outer receiving grooves 58 being arranged fixedly in a carrier body 60, fastened to the shank 42, of the setting head 44, and the respectively middle receiving groove 58' being formed on a finger-like setting element 62 which, as shown in FIGS. 2 and 3, is mounted on the carrier body 60 displaceably in the radial direction and so as to be capable of being forced back counter to the force of a compression spring 64. As is apparent, in particular, from FIG. 3, when the setting element 62 is in the position of rest the respective receiving groove 58' is arranged further outward, as seen in the radial direction, than the other two receiving grooves 58.

Two parallel shields 66 project from the housing 40 on the side facing away from the conduit robot vehicle 22, said shields being connected in the free end region via spacer bars 68 and being capable of being supported on the tube inner wall 14' via a support wheel 70 which, if appropriate, can be moved in and out. Arranged pivotably between the two shields 66 is a generally known TV camera 72 which is connected via signal lines to the control and monitoring unit. It serves, in particular, for the visual control and verification of the setting head.

A rocker-like guide means 74 for the articles is arranged in the free end region of the shields 66. A mounting 78, in which two guiding and braking plates 80, 80' are arranged, is fastened, along an axis 76' running at right angles to the longitudinal axis 22', to a carrying stirrup 76 which is formed from sheet metal with a lateral bent-up edge portion and which is mounted on the shields 66 pivotably about the axis 76'. These plates delimit a guide gap 82 and have, on the sides facing one another, guide depressions 82' for the articles 20. The three articles 20 are thereby held and guided next to one another at a defined distance from one another. Furthermore, for each pair of guide depressions 82', there is arranged on the mounting 78 a setscrew 84, by means of which the width of the guide gap 82 and the respective guide depression 82' can be set, in order, when the device 10 is moved in the working direction A, to apply a frictional force individually to each article 20, so as to tension the articles 20 or keep them tensioned. The guiding and braking plates 80, 80' consist preferably of a flexible plastic, for example Nylon or Teflon.

Fastened to that end of the lever-like carrying stirrup 76 which is located on the setting-head side is a guide body 88 which is provided with three passages for guiding the articles 20. The guide depressions 82' and the passages in the guide body 88 are coordinated with the receiving grooves 58, 58'.

Furthermore, two guide elements 90, through each of which a rod 92 passes, are fastened to the carrying stirrup 76 below the latter. At their end projecting above the shields 66, the rods 92 are connected to one another by means of a guide bow 94 which is open upwardly and is in the form of a segment of a circle. When the rods 92 are drawn out away from the setting head 44, the articles 20 run through this guide bow 94. After the fastening screws 96 have been released, the rods 92 can be moved out of the moved-out position, indicated in FIG. 2 by the rods shown by broken lines, inward in the direction toward the conduit robot vehicle 22, until the guide bow 94 is located at the guide elements 90. The length of the working unit 24 can thereby be reduced considerably so as to introduce it into or remove it from the tube 14 through a vertical shaft.

FIGS. 1 and 2 show by unbroken lines the pivoting position of the guide means 74 when the setting head 44 is lowered in the position of rest and the articles 20 are not yet introduced into the clamps 18. Dashes and dots indicate the setting head 44 in the moved-out setting position and the corresponding pivoting position of the guide means 74.

Figure 4:
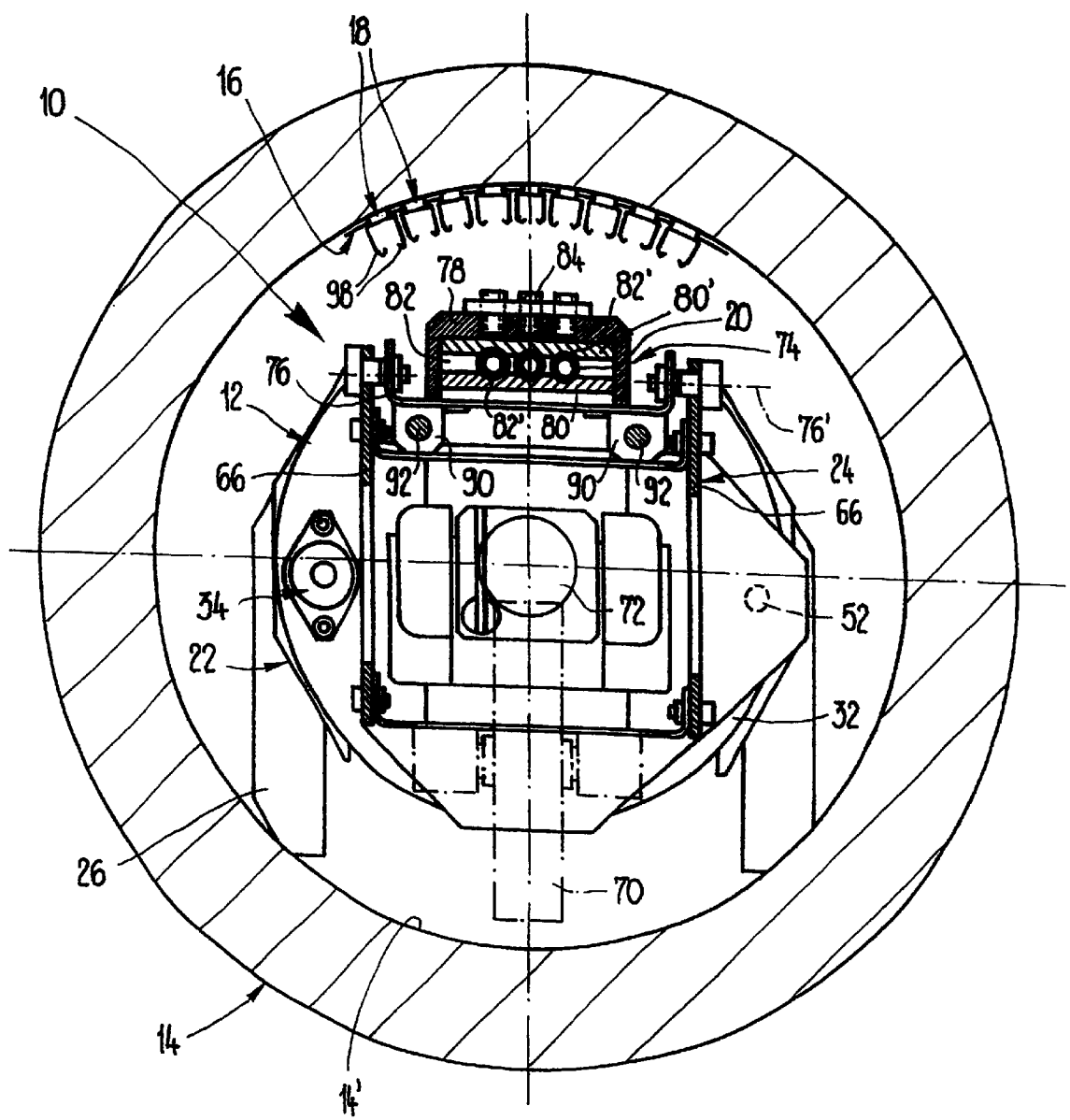
FIG. 4 shows a side view of the device, partly in section along the line IV—IV of FIG. 2.

As may be gathered from FIGS. 3 and 4, the clamps 18 have two resilient clamp tongues 98, between which an article 20 can be inserted in each case. In each case the middle of the three articles 20 is first inserted into the associated clamp 18 and only thereafter are the two outer articles 20 simultaneously inserted into the adjacent clamps 18. Since articles 20 are not simultaneously inserted into two adjacent clamps 18, in each case only the range of deflection of the clamp tongues 98 of one of these clamps 18 is required, thus making it possible for the clamps 18 to be arranged very closely to one another.

After the inner collars 16 carrying the clamps 18 have been put in place, for example by means of a device, such as is disclosed in EP patent application No. 98 102 681.8, and after the articles 20 have been drawn in, if there is sufficient space the entire device 10 is lowered, for example by means of a crane, into the shaft from which the tube 14 leads away. If there is not sufficient space available, the conduit robot vehicle 22 and the working unit 24 are lowered into the shaft separately and are attached to one another in the shaft by means of the bayonet fastening 38, and the connections 36 are connected. Subsequently, the articles 20 are introduced into the guide means 74 and the receiving grooves 58, 58' of the setting element 62. If this cannot be carried out with the end of the articles 20, in this case the articles 20 can be introduced into the guide gap 82 and into the guide body 88, the guide means 74 may be designed in such a way that both the guide body 88 and the guide gap 82 can be opened in order to introduce the articles 20.

After the end of this preparatory work, the device 10, driven by the conduit robot vehicle 22, with the working unit 24 in front, is moved by remote control into the tube 14 in the working direction A, until the setting head 44 has reached the first inner collar 16 having the clamps 18. The measuring wheel 28 and the TV camera 72 serve for detecting this position.

By the turntable 32 being rotated, the working unit 24 is brought into the desired rotary position, this, in turn, taking place by remote control with the aid of the TV camera 72. The setting head 44 is then moved out of its position of rest outward in the radial direction, with the result that the middle of the three articles 20 is inserted first into the respective clamp 18. As may be gathered from FIGS. 1 and 2, in this case the clamps 18 are arranged between the two rows 56, 56' of receiving grooves 58, 58'. This prevents the articles 20 from being bent when they are introduced into the self-closing clamps 18. After the middle article 20 is inserted into the respective clamp 18, the setting head 44 is moved further out in the radial direction so as to introduce the two outer articles 20 into the respective clamps 18, the result of this being that the setting element 62 is forced back into the carrier body 60 counter to the force of the compression spring 64. In order, at the same time, to avoid damage to the respective article 20, the flanks of the setting element 62 project beyond the respective article 20', so that these flanks can come to bear on the tube inner wall 14' and said setting element is thus forced back directly by the tube 14 and not indirectly via the article 20. The compression spring 64 is, of course, designed in such a way that its force exerted on the setting element 62 is greater than the force required to insert the respective article 20 into the clamp 18.

After the three articles 20 are inserted into the clamps 18, the setting head 44 is once again moved in in the radial direction, the receiving grooves 58, 58' leaving the articles 20 which, in this case, maintain the position indicated by dashes and dots in FIGS. 1 and 2. After a check by means of the television camera 72, the device 10 is moved in the working direction A as far as the next following inner collar 16. At the same time, as a result of the action of the guiding and braking plates 80, 80', a pull is exerted on the articles 20, and these are held, stretched out, if they are articles 20 with low inherent stability. During this forward movement, the guide means 74 is gradually pivoted counterclockwise as a result of the weight of the articles 20, with the result that the articles 20 held next to one another in parallel come into engagement again with the respective receiving grooves 58, 58', this taking place first with the middle article 20. Subsequently, the articles 20 are inserted into the clamps 18 in the same way. These work steps are repeated until the end of the tube or the next shaft is reached.

In the example shown, the inner collars 16 each have nine clamps 18. In this case, preferably, first the middle three clamps 18 are fitted with articles 20. Any further articles 30 are then inserted, up to three together, into the clamps on one side or the other.

It is also possible, of course, to introduce only one or two articles 20 into the clamps 18 by means of the device shown.

If a support wheel 70 is provided, this may also be arranged fixedly on the working unit 24. In order to allow the working unit 24 to rotate about the longitudinal axis 22', however, said support wheel is advantageously spaced from the tube inner wall 14', so that it can come to bear on the tube inner wall 14', for support, only when the articles 20 are being inserted into the clamps 18.

Preferred inner collars 16 with clamps 18 are disclosed in EP patent application 98 102 682.6.

However, the present device may, of course, also be used for inserting elongate articles into clamps which are fastened directly to the tube.

FIGS. 5 to 13 show a further exemplary embodiment of the device 10, parts comparable to one another being provided with the same reference symbols again. This device 10 has a substantially lower tilting moment, as compared with that described above.

For this purpose, the traveling frame 12 comprises a main module 100 which is capable of being placed onto the turntable 32 of the self-propelled conduit robot vehicle 22 and in which are arranged the necessary electronic components, pneumatic or hydraulic valves, the drive 46, 48 for moving the setting head 44 and the pivoting drive 102 for a support wheel 70.

This main module is always the same, irrespective of the diameter of the man-inaccessible tube 14.

Figure 5:
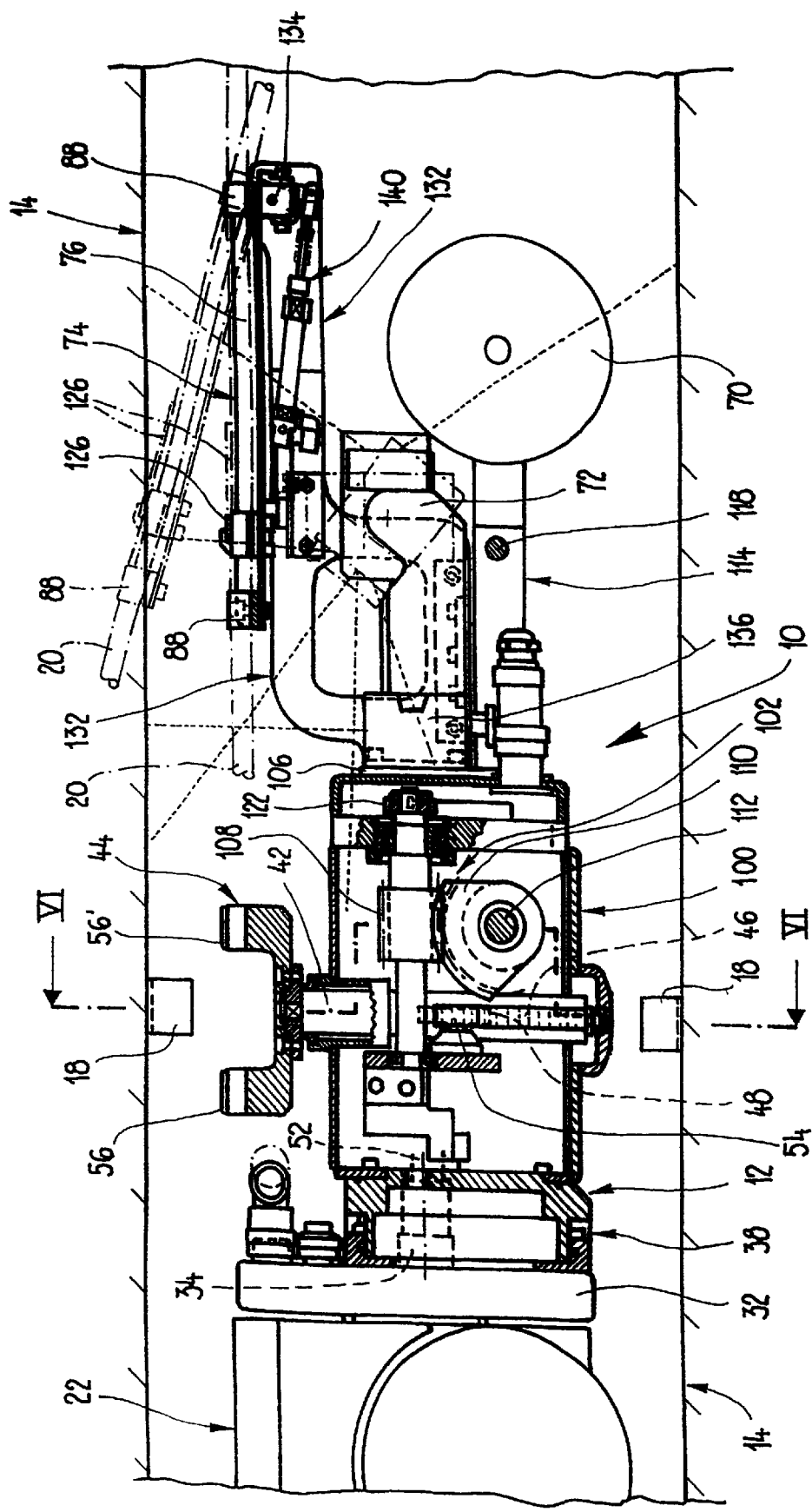
FIG. 5 shows a view, corresponding to that of FIG. 1, of a further embodiment of a device for inserting elongate articles into clamps.

In order to adapt the device 10 to different diameters of the man-inaccessible tube 14, the setting head 44 and the guide means 74 can be coupled to the main module 100 via adapters 104 (cf. FIGS. 11 to 13) or 106 (cf. also FIG. 5). By means of these adapters 104 or 106, capable of being inserted between the setting head 44 and the shank 42, on the one hand, and between the guide means 74 and the box-like housing of the main module 100, on the other hand, the setting head 44 and the guide means 74 can be offset in the radial direction according to the diameter of the respective man-inaccessible tube 14. Moreover, the gage of the self-propelled conduit robot vehicle 22 can be set according to the diameter of the man-inaccessible tube 14. Expediently, in this case, care is taken to ensure that, by means of an appropriate setting, the longitudinal axis of the self-propelled conduit robot vehicle 22 coincides at least essentially with the longitudinal axis of the man-inaccessible tube 14. Finally, the support wheel 70 can be pivoted inward and outward according to the respective diameter of the man-inaccessible tube 14.

Figure 10:
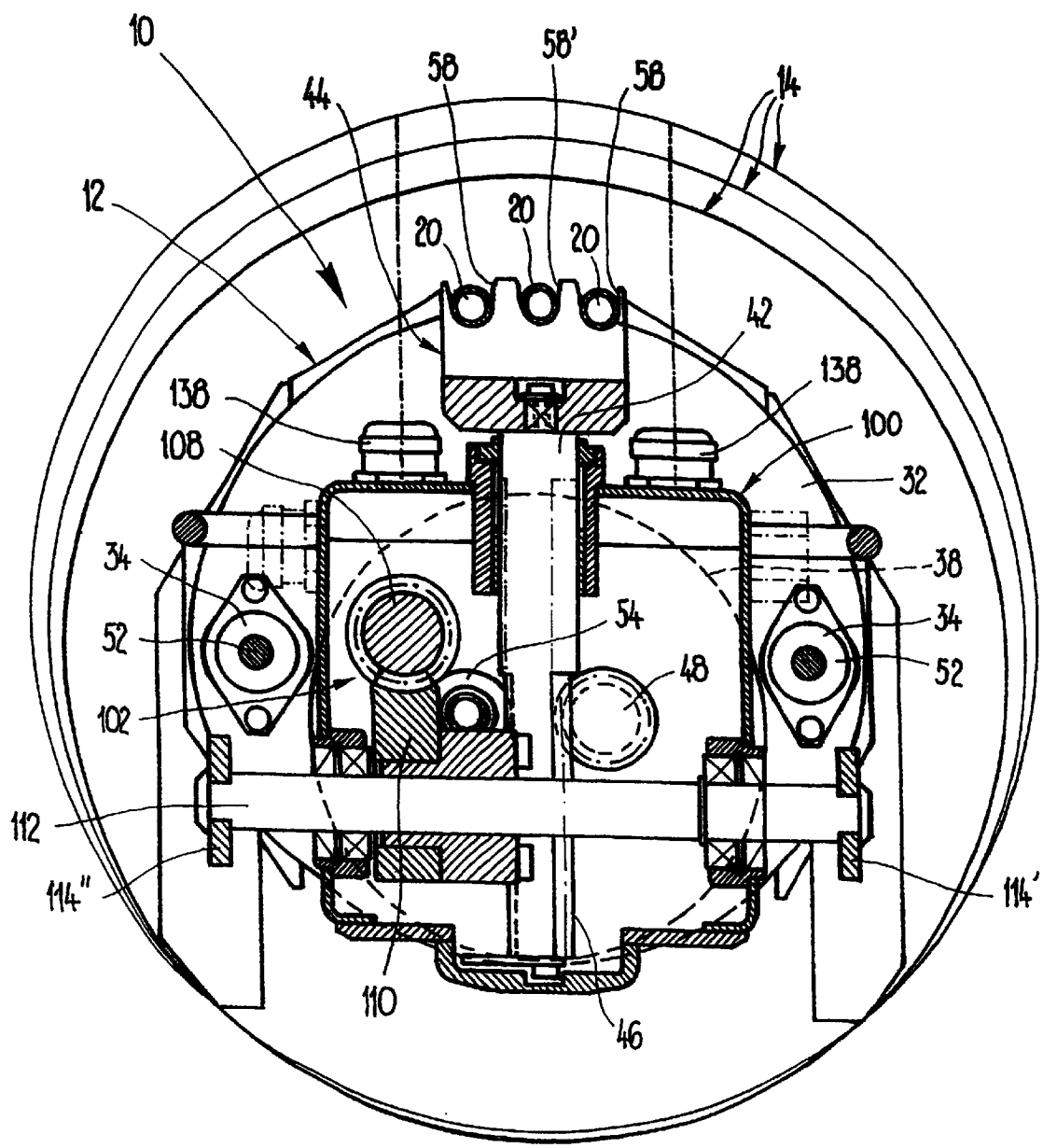
FIG. 10 shows the device shown in FIG. 1 in a section corresponding to the line VI—VI of FIG. 1.

The drive shaft 52 coupled to the two output shafts 34 of the turntable 32 can also be seen again, in particular, in FIG. 10. The setting head 44 is again moved in and out via one of the two output shafts 34 of the turntable 32. The other output shaft 34 serves for the inward and outward pivoting of the support wheel 70 (cf., in particular, also FIGS. 5 to 7).

The support wheel 70 is pivoted in and out via the worm gear 102 (cf., in particular, FIGS. 5, 7 and 10), a worm 108 driven by the respective output shaft 34 meshing with a worm wheel segment 110 which is seated fixedly in terms of rotation on a shaft 112 mounted on the housing of the main module 100. As can best be seen from FIG. 7, the support wheel 70 is mounted rotatably at one end of a carrier 114 which, in the present case, is two-limbed and the two limbs 114' and 114" of which are fastened at the other end to the ends of the shaft 112 which emerge from the housing of the main module 100. The two limbs 114' and 114" of the carrier 114 are connected to one another via at least one transverse strut 118.

Figure 7:
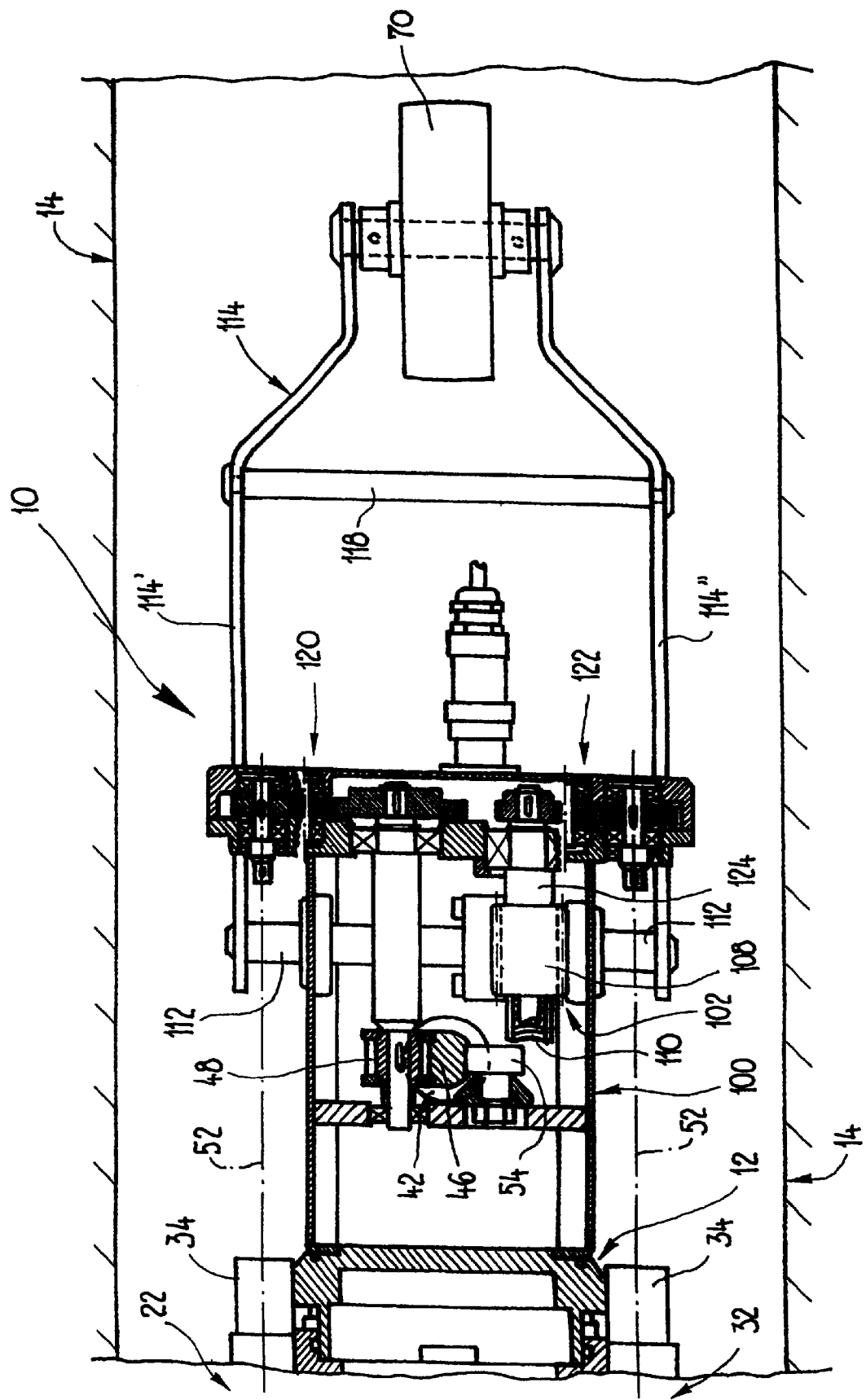
FIG. 7 shows a horizontal section through the device according to FIG. 5 without the guide means.

The drive for moving the setting head 44 once again comprises a portion of the shank 42, said portion being designed as a rack 46, and a gearwheel 48 mounted on the housing of the main module 100 and cooperating with the rack 46 (cf., in particular, FIGS. 5, 7 and 10). In order to keep the rack 46 in engagement with the gearwheel 48, a support roller 54 is also provided again opposite said gearwheel. In the present case, however, the gearwheel 48 is no longer connected to the respective driveshaft 52 via a toothed belt, but via a gearwheel mechanism 120. A corresponding gearwheel mechanism 122 is also provided between the shaft 124 carrying the worm 108 and the other driveshaft 52.

The setting head 44 is otherwise moved in and out in the same way as in the exemplary embodiment described above.

Figure 6:
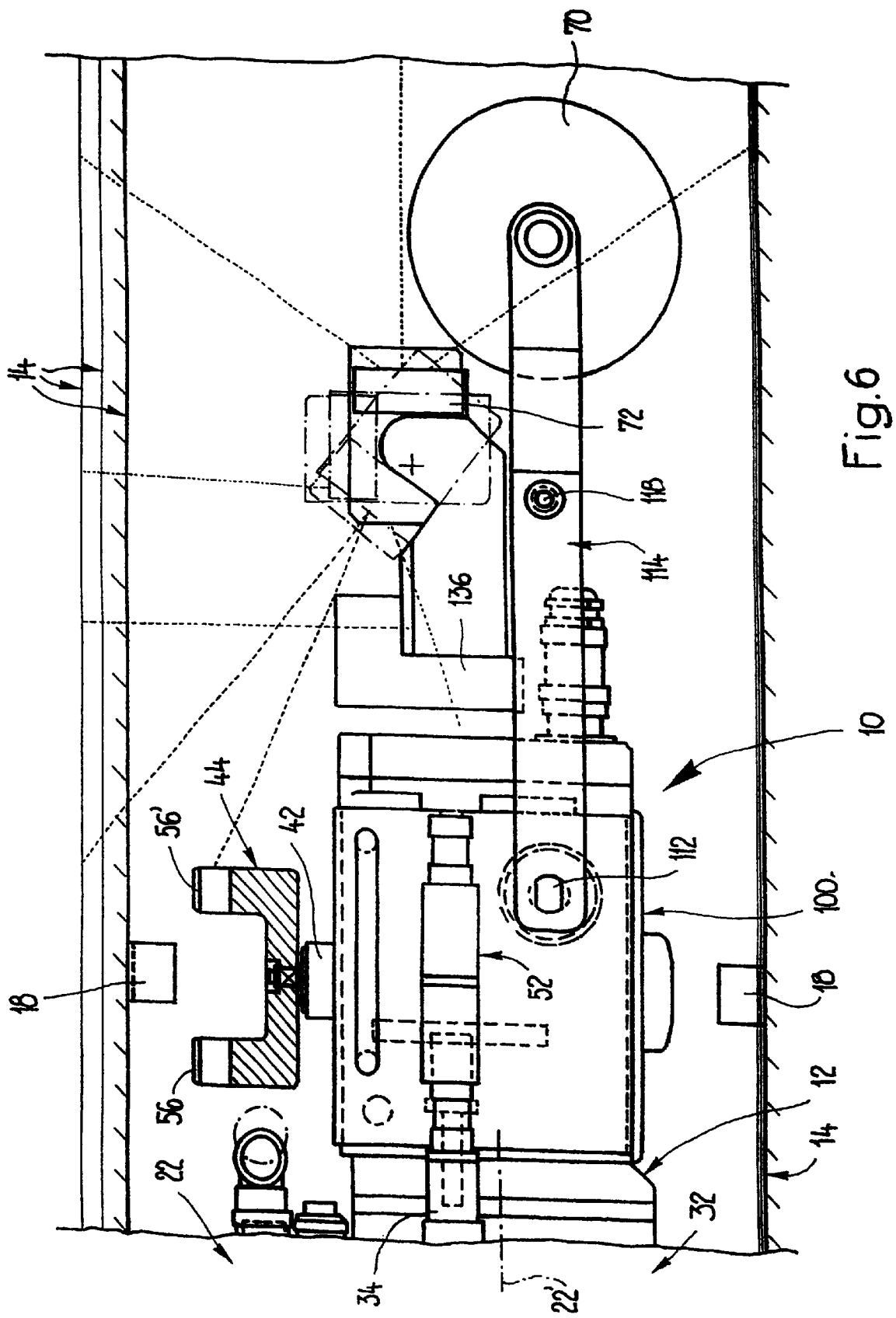
FIG. 6 shows a side view of the device according to FIG. 5, the guide means being omitted for the sake of clarity.

As may be seen, in particular, from FIGS. 6 and 10, the setting head 44 again has two rows 56, 56', spaced from one another in the direction of the longitudinal axis 22', of receiving grooves 58 running in the direction of the longitudinal axis, the respectively mutually aligned receiving grooves 58 of the two rows 56 and 56' being intended for receiving the same article 20. As may be seen from FIG. 10, in the present case the middle receiving groove 58 of a respective groove row is also arranged fixedly on the setting head 44. Consequently, all three articles 20, such as, for example, cables or protective pipes for cables, are inserted simultaneously into the respectively adjacent clamps 18 (cf., in particular, FIGS. 5 and 6). In order to make this possible, in the present case these clamps 18 are spaced correspondingly further from one another.

Moreover, in the present exemplary embodiment, the guide bow 94 provided in the exemplary embodiment described above is absent.

Figure 8:
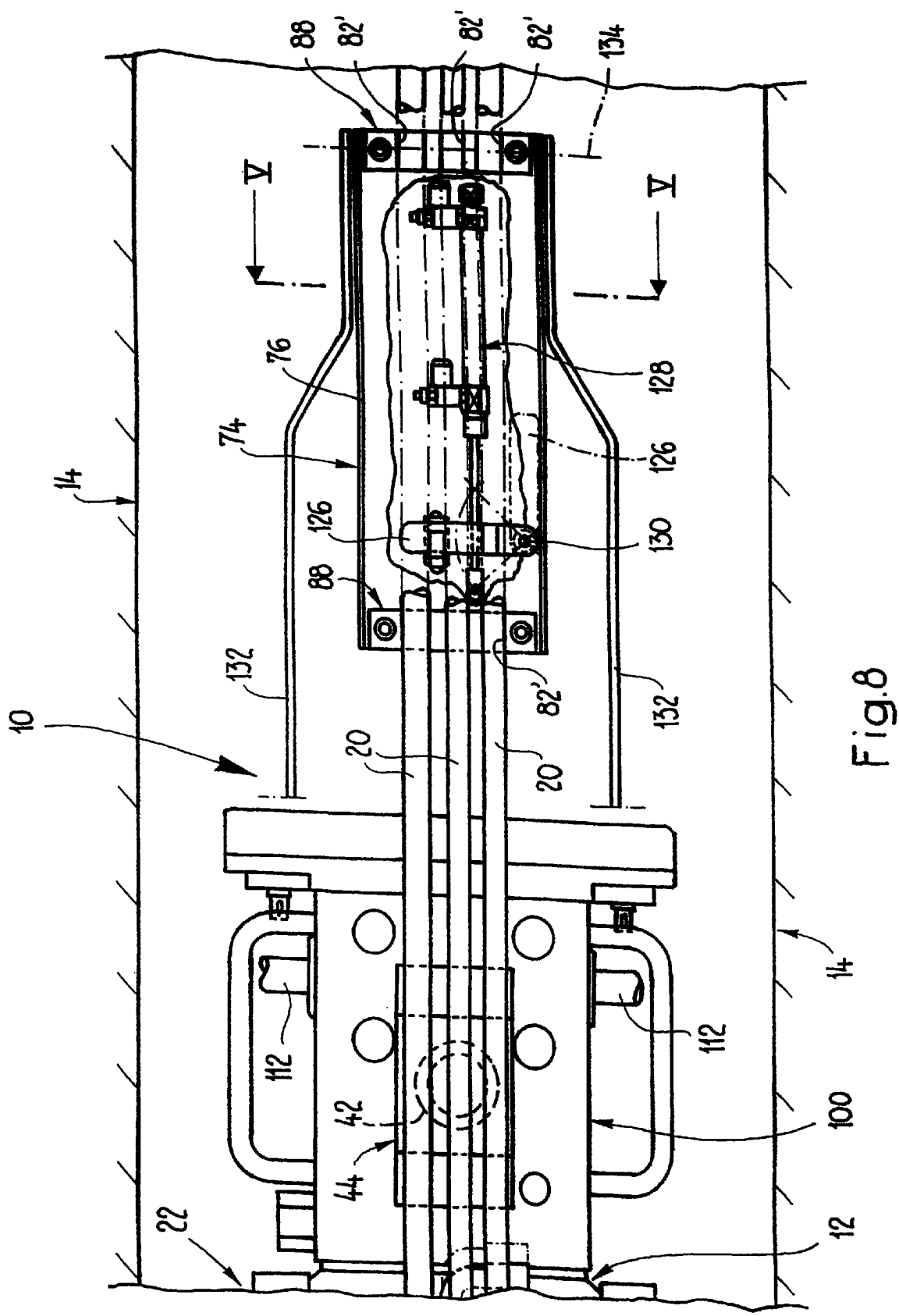
FIG. 8 shows a top view of the device according to FIG. 5.

The guide means 74 comprises merely two guide bodies 88 in each case with three grooves 82' arranged next to one another for the articles 20 formed, for example, by protective pipes or optical fiber cables (cf., in particular, FIGS. 5 and 8).

Figure 9:
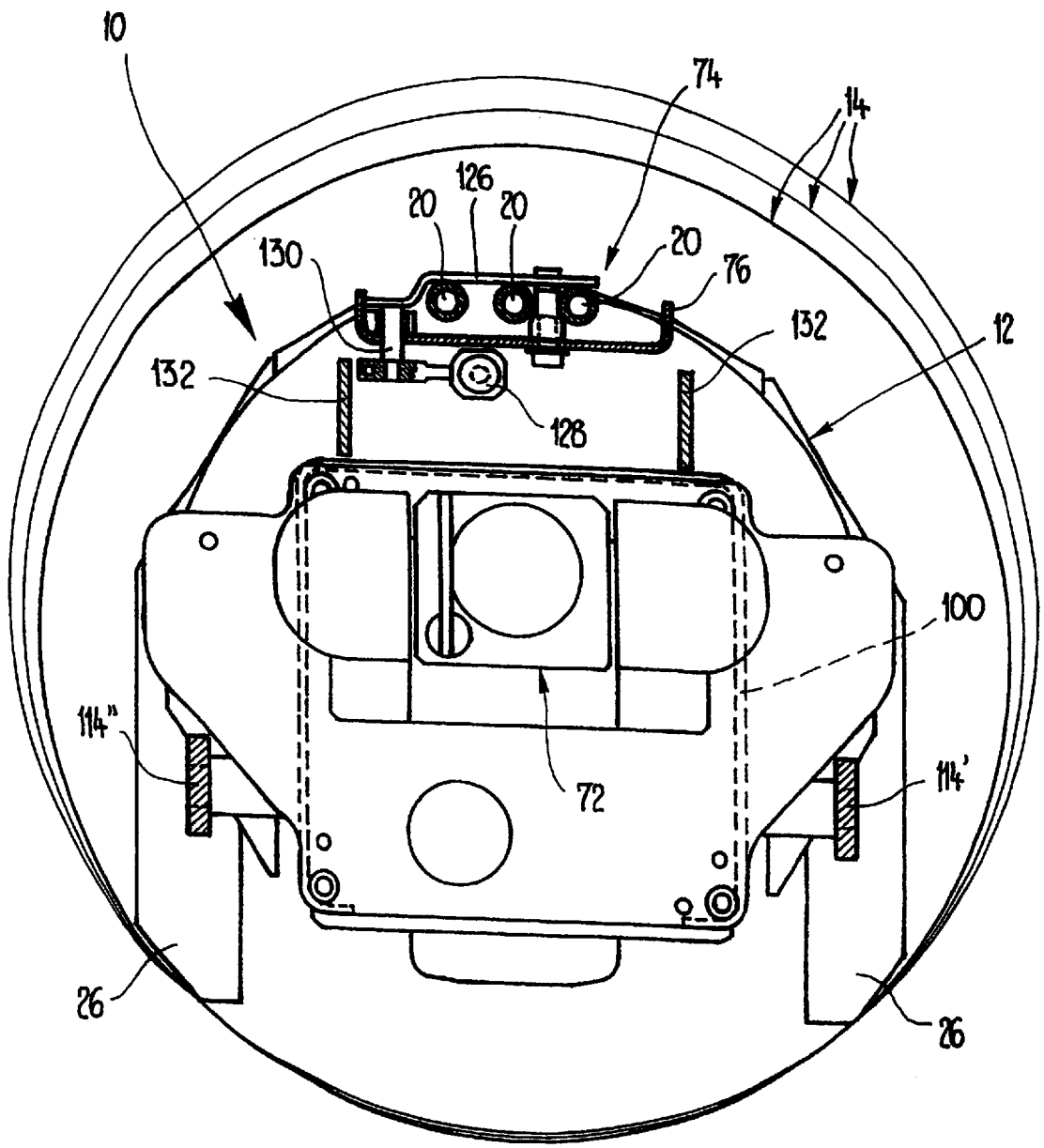
FIG. 9 shows the device shown in FIGS. 5 and 8 in a section corresponding to the line V—V of FIG. 8.

As may be gathered, in particular, from FIGS. 5, 8 and 9, the guide means 74 is assigned a guide lever 126 which is arranged in the region of the guide bodies 88 located nearer to the setting head 44 and which is adjustable by means of a cylinder/piston unit 128 between a holding position, in which the articles 20 are held at least essentially in the grooves 82' of the guide bodies 88 or are engaged over by the guide lever 126, and a release position, in which the articles 20 are released. As may best be inferred from FIGS. 8 and 9, for this purpose, the guide lever 126 can be pivoted essentially through 90° about an axis 130 perpendicular to the longitudinal axis 22'. This prevents the articles 20 from escaping from the grooves 82' of the guide bodies 88 when the guide lever 126 is in the holding or guiding position.

When the robot has to be moved out of the man-inaccessible tube 14, for example if flood water arises, the guide lever 126 is pivoted about the axis 130 into the release position, in which the articles 20, formed, for example, by protective pipes or optical fiber cables, are released, so that the robot can then be moved freely in both directions. Moreover, the guide lever 126 makes it simpler to introduce the, in particular, pipe-like or cable-like articles into the grooves 82' of the guide bodies 88 when the robot is being prepared for mounting.

As may be inferred, in particular, from FIGS. 5 and 8, the guide means 74 comprises a carrying stirrup which forms a kind of rocker 76 and which is mounted pivotably on a basic body 132 coupleable to the main module 100 (cf., in particular, FIG. 5). Both this basic body 132 and the main module 100 remain the same, regardless of the respective diameter of the man-inaccessible tube 14.

When the guide lever 126 assigned to the rocker 76 is pivoted into its release position, the rocker, also having the guide bodies 88 and being pivotable about the axis 134, is automatically pivoted downward away from the articles as a result of its weight.

It has been shown that there is no need for any braking means for the tensioning of protective pipes.

In this case, therefore, the braking means described in connection with the above exemplary embodiment can be dispensed with. However, the use of such a braking means may be expedient, for example during the laying of cables.

As becomes clear, in particular, from FIGS. 5, 6 and 9, in the present case, too, a color television camera 72 pivotable about an axis perpendicular to the longitudinal axis 22' (cf. FIG. 6) is again provided. In the present case, said camera is mounted correspondingly pivotably in the basic body 132. Furthermore, in the present case, a fixedly arranged, radially oriented black-and-white camera 136 (cf., in particular, FIG. 5) is additionally provided. This black-and-white camera 136 may serve, in particular, for inflows into the man-inaccessible tube 14 and tube packings and into the collars set in the man-inaccessible tube 14. If, for example, such a collar has been detected, the robot is moved forward over the distance between the black-and-white camera 136 and the setting head 44 used for setting the collars, so that this setting head 44 comes to rest symmetrically to the respective collar.

As may best be seen from FIG. 10, laser pointers 138 are arranged on the housing of the main module 100 on both sides of the setting head 44 and may serve, in particular, as a target device for the exact positioning of a respective collar or of the clamps 18. The mutually parallel laser beams generated are indicated by dashes and dots in FIG. 10.

In the present case, the rocker 76 provided with the guide bodies 88 and mounted on the basic body 132 pivotably about the axis 134 is capable of being pivoted relative to the basic body 132 via at least one cylinder/piston unit 140. The rocker 76 can therefore be forcibly pivoted in, for example in the event of apending evacuation of the robot.

Thus, in the present embodiment, the same self-propelled conduit robot vehicle 22, the same main module 100 and the same guide means, comprising in the present case the rocker 76 and the basic body 132 with the cameras 72 and 136, can always be used, regardless of the respective diameter of the man-inaccessible tube. In order to adapt the robot to different diameters of the man-inaccessible tube 14, the setting head 44 and the guide means 74 are coupled to the main module 100 via corresponding adapters 104, 106 and/or a corresponding number of adapters. Moreover, the support wheel 70 is pivoted in and out according to the respective diameter of the man-inaccessible tube 14. Also, the gage of the self-propelled conduit robot vehicle 22 can be set according to the respective tube diameter.

Figure 11:
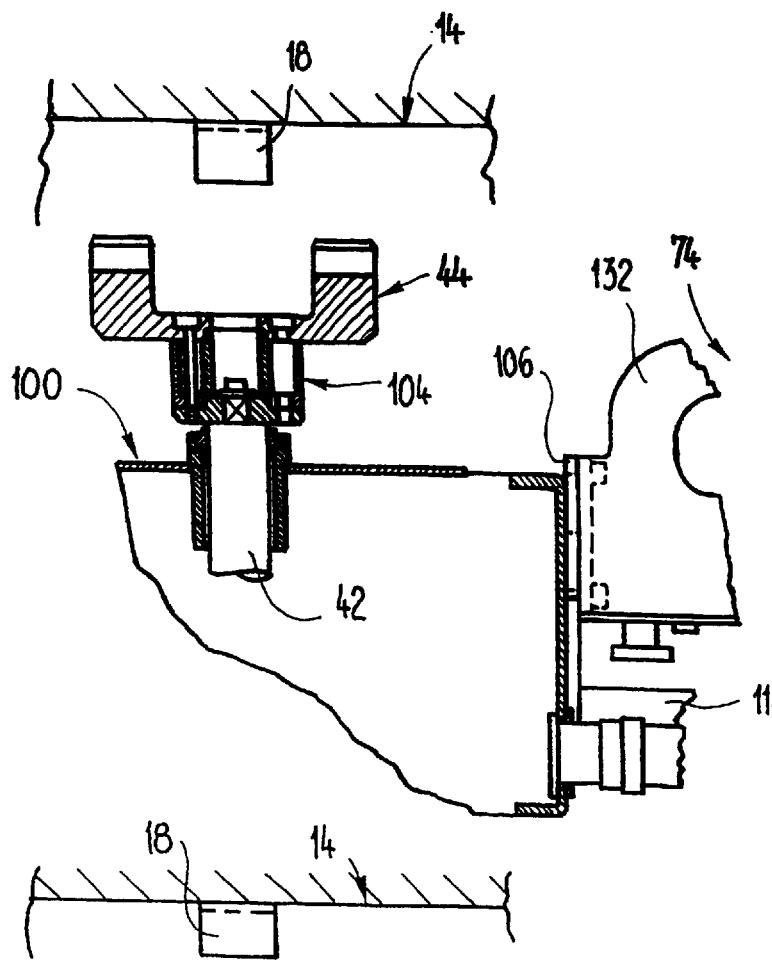
FIGS. 11 to 13 show side views of part of the device according to FIG. 5 with adapters for adapting to different diameters of the man-inaccessible tube.
Figure 12:
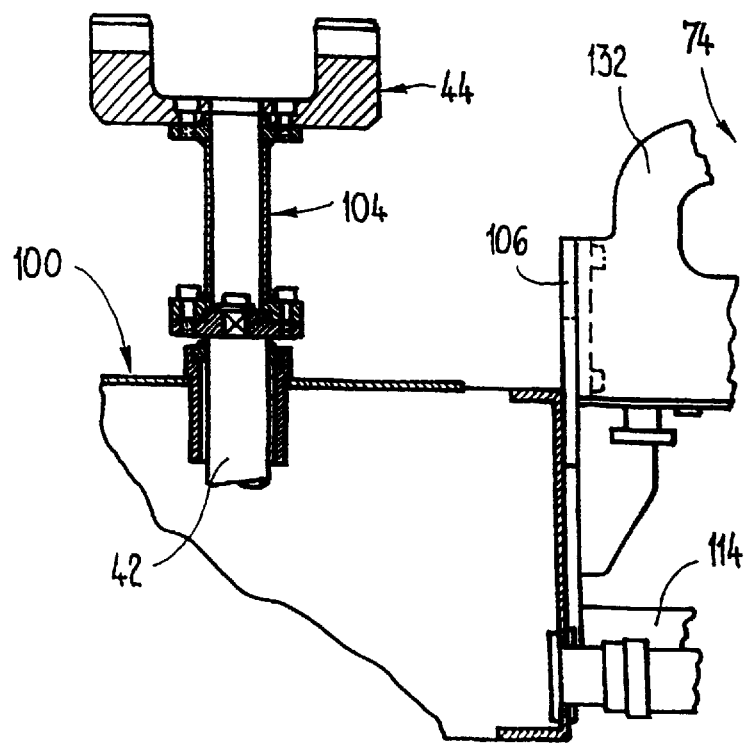
Figure 13:
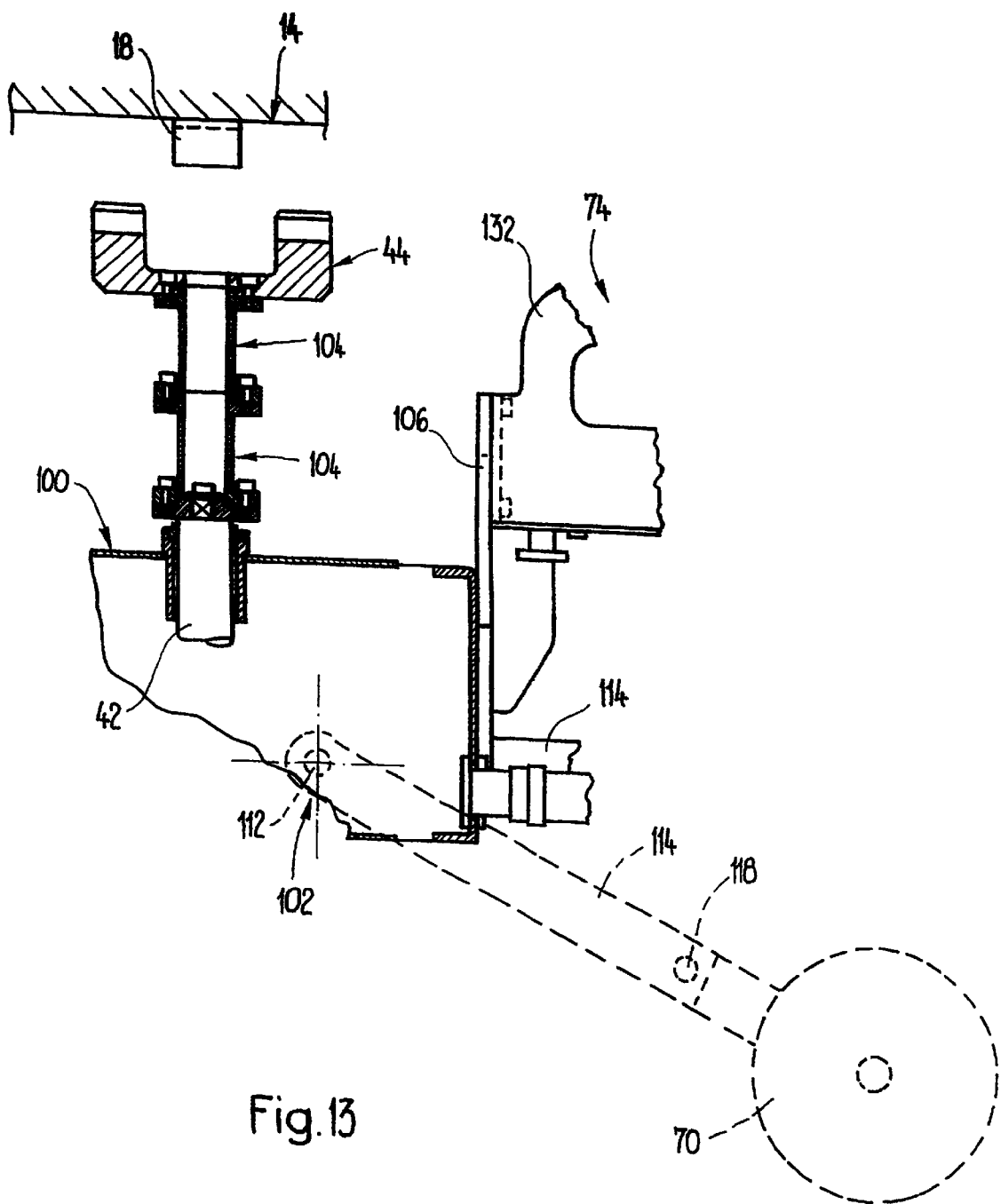

FIG. 5 illustrates the robot with its basic equipment for man-inaccessible tubes 14 having an inside diameter of, for example, 300 mm. In this case, no adapter is required between the setting head 44 and the shank 42. The guide means 74 is fastened to the housing of the main module 100 via a relatively small adapter plate 106. This adapter plate 106 may be designed differently, depending on the inside diameter of the man-inaccessible tube 104. Thus, for example, adapters for other tube inside diameters of, for example, 350 mm, 400 mm, 450 mm, 500 mm and/or 600 mm may also be provided. In principle, however, adapters for other tube inside diameters may also be envisaged. FIGS. 11 to 13 show a side view of part of the device according to FIG. 5 with adapters 104 and 106 for adapting to other different inside diameters of the man-inaccessible tube 14.

Thus, FIG. 11 shows the robot with equipment for man-inaccessible tubes 14, the inside diameter of which is, for example, approximately 350 mm. As already mentioned, however, other diameters may, in principle, also be envisaged. According to this FIG. 11, a tube-like adapter 104 is inserted between the setting head 44 and the shank 42 mounted in the main module 100. The basic body 134 of the guide means 74 is fastened to the housing of the main module 100 via an adapter plate 106 which is somewhat larger than in the equipment according to FIG. 5 and, in the present case, projects upward somewhat beyond the housing of the main module 100.

Thus, as compared with the basic equipment illustrated in FIG. 5, in the present case the setting head 44 and the guide means 74 are offset further outward radially with respect to the main module 100.

FIG. 12 shows robotic equipment which is designed for man-inaccessible tubes of somewhat larger inside diameter, here, for example, 450 mm.

Accordingly, a correspondingly longer tube-like adapter 104 is inserted between the setting head 44 and the shank 42 mounted in the main module 100. The basic body 134 assigned to the guide means 74 is fastened to the housing of the main module 100 via a correspondingly larger adapter plate 106. As can be seen from a comparison of FIG. 12 with FIG. 11, in the present case the setting head 44 and the guide means 74 are offset a corresponding distance further outward radially with respect to the main module 100.

FIG. 13 shows robot equipment for man-inaccessible tubes of even larger inside diameter, in the present case, for example, 600 mm. In this case, two tubular adapters 104 are inserted between the setting head 44 and the shank 42 mounted in the main module 100. The basic body 135 assigned to the guide means 74 is fastened to the housing of the main module 100 via an even larger adapter plate 106. Correspondingly, in the present case, the setting head 44 and the guide means 74 are offset a further distance radially outward with respect to the main module 100.

The downwardly pivoted support wheel 70 can also be seen by dashes in this FIG. 13. In this case, the adapters 104, 106 and the settings may be selected, in particular, such that the mid-axis 22' of the robot coincides at least essentially with the mid-axis of the man-inaccessible tube 14.

The tubular adapters 104 between the setting head 44 and the shank 42 may have a length of, for example, between about 25.5 and about 75 mm, for example according to the graduation of the standard nominal widths of the tubes 14. Even two or more adapters may be combined with one another particularly for larger nominal widths. In this case, the adapters combined with one another may have an equal length or else be at least partially of different length.

The embodiment described with reference to FIGS. 5 to 13 may otherwise have at least essentially the same design as the embodiment described above.

What is claimed is:

1. A device for inserting elongate articles, such as cables or pipes, into clamps which are arranged inside a man-inaccessible tube, the device comprising:
   a frame capable of being supported on a tube inner wall movably in a longitudinal direction of the tube;
   a setting head arranged on the frame radially movably in relation to the longitudinal axis of the frame, the setting head having at least one receiving groove running at least approximately in the direction of the longitudinal axis and being open outward in a radial direction for receiving the articles; and
   a drive for moving the setting head in the radial direction, wherein the setting head has at least two parallel receiving grooves arranged next to one another, each for an article, and wherein a guide means for guiding the articles at least approximately parallel to one another in alignment with the receiving grooves is provided, the guide means being adjustable between a holding position for holding the articles and a release position for releasing the articles.

2. The device as claimed in claim 1, wherein one of the receiving grooves is arranged further outward in the radial direction than the other of the receiving grooves and in a setting element capable of being forced back in the radial direction.

3. The device as claimed in claim 2, wherein the setting element is capable of being forced back in the radial direction counter to a spring force.

4. The device as claimed in claim 2, wherein at least one receiving groove is arranged on each side of the setting element, as seen in a circumferential direction.

5. The device as claimed in claim 2, wherein the setting head has two rows, spaced in a direction of the longitudinal axis, of the receiving grooves.

6. The device as claimed in claim 1, wherein the frame has a self-propelled conduit robot vehicle with a rotary means for rotating the setting head about the longitudinal axis.

7. The device as claimed in claim 1, wherein the guide means is arranged on the frame, in front of the setting head, as seen in a working direction for inserting the articles.

8. The device as claimed in claim 7, wherein the guide means has a friction brake preferably capable of being set individually for each article.

9. The device as claimed in claim 1, wherein a drive for moving the setting head is in a main module capable of being placed onto the rotary means of the self-propelled conduit robot vehicle, and wherein the setting head and the guide means can be coupled to the main module in each case via at least one adapter.

10. The device as claimed in claim 9, wherein a pivoting drive for a support wheel is additionally accommodated in the main module.

11. The device as claimed in claim 10, wherein the support wheel can be pivoted inward and outward according to a diameter of the man-inaccessible tube.

12. The device as claimed in claim 9, wherein at least part of electronic components, pneumatic valves and/or hydraulic valves operating the device are accommodated in the main module.

13. The device as claimed in claim 1, wherein the guide means is assigned at least one guide lever which is adjustable between a holding position, in which the articles are held in the guide means, and a release position, in which the articles are released.

14. The device as claimed in claim 1, wherein the guide means comprises a rocker which is provided with guide elements and which is mounted pivotably on a basic body coupleable to the main module.

15. The device as claimed in claim 1, wherein the rocker provided with guide elements is pivotable with respect to the basic body via at least one cylinder/piston unit.

16. The device as claimed in claim 6, wherein the gage of the self-propelled conduit robot vehicle can be set according to a diameter of the man-inaccessible tube.

17. A device for inserting elongate articles, such as cables or pipes, into clamps which are arranged inside a man-inaccessible tube, the device comprising:
   a frame capable of being supported on a tube inner wall movably in a longitudinal direction of the tube;
   a setting head arranged on the frame radially movably in relation to the longitudinal axis of the frame, the setting head having at least one receiving groove running at least approximately in the direction of the longitudinal axis and being open outward in a radial direction for receiving articles; and
   a drive for moving the setting head in the radial direction, wherein the setting head has at least two parallel receiving grooves arranged next to one another, each for an article, and wherein one of the receiving grooves is arranged further outward in the radial direction than the other receiving grooves and in a setting element capable of being forced back in the radial direction.

18. The device as claimed in claim 17, wherein the setting element is capable of being forced back in the radial direction counter to a spring force.

* * * * *